United States Patent [19]

Matsuura et al.

[11] Patent Number: 5,616,435
[45] Date of Patent: Apr. 1, 1997

[54] HYDROGEN-ABSORBING ALLOY ELECTRODE FOR METAL HYDRIDE ALKALINE BATTERY

[75] Inventors: Yoshinori Matsuura; Yasushi Kuroda; Nobuyuki Higashiyama; Mamoru Kimoto; Mitsuzou Nogami; Koji Nishio, all of Osaka; Toshihiko Saito, Mihara-gun, all of Japan

[73] Assignee: Sanyo Electric Co., Ltd., Osaka, Japan

[21] Appl. No.: 504,550

[22] Filed: Jul. 20, 1995

[30] Foreign Application Priority Data

Jul. 22, 1994 [JP] Japan .................... 6-191981

[51] Int. Cl.$^6$ .................... H01M 4/02
[52] U.S. Cl. .................... 429/218; 429/59; 429/101; 429/223; 429/224; 420/455; 420/900
[58] Field of Search .................... 429/59, 101, 223, 429/218, 224; 420/455, 900

[56] References Cited

U.S. PATENT DOCUMENTS

| 4,893,756 | 1/1990 | Fetcenko et al. . |
| 5,219,678 | 6/1993 | Hasebe et al. .................... 429/59 |

FOREIGN PATENT DOCUMENTS

| 0420669 | 3/1991 | European Pat. Off. . |
| 0550153 | 7/1993 | European Pat. Off. . |
| 0602768 | 6/1994 | European Pat. Off. . |
| 0621647 | 10/1994 | European Pat. Off. . |
| 0647973 | 4/1995 | European Pat. Off. . |
| 2-253558 | 10/1990 | Japan . |
| 3-116655 | 5/1991 | Japan . |
| 3-216959 | 9/1991 | Japan . |
| 3-245460 | 11/1991 | Japan . |
| 4-126361 | 4/1992 | Japan . |
| 4-314803 | 11/1992 | Japan . |
| 5-3031 | 1/1993 | Japan . |

OTHER PUBLICATIONS

Patent Abstracts of Japan, vol. 14, No. 537, JP–A–02 227 958 *abstract* Sep. 1990.
Patent Abstracts of Japan, vol. 14, No. 154, JP–A–02 012 766 *abstract* Jan. 1990.
Patent Abstracts of Japan, vol. 12, No. 438, JP–A–63 162 884 *abstract* Jul. 1988.

*Primary Examiner*—M. Nuzzolillo
*Attorney, Agent, or Firm*—Birch, Stewart, Kolasch & Birch, LLP

[57] ABSTRACT

A hydrogen-absorbing alloy electrode for metal hydride alkaline batteries is obtained by coating or filling a collector with a hydrogen-absorbing alloy powder consisting essentially of spherical particles and/or nearly spherical particles and then sintering the powder, the powder having an average particle diameter of 30 to 70 µm and containing 5 to 30% by volume of particles having a diameter of at least 2 times the average diameter and 10 to 40% by volume of particles having a diameter of not more than ½ of the average diameter. This electrode can give metal hydride alkaline batteries having excellent high-rate discharge characteristics and a long life.

6 Claims, 8 Drawing Sheets

5,616,435

HYDROGEN-ABSORBING ALLOY ELECTRODE FOR METAL HYDRIDE ALKALINE BATTERY

BACKGROUND OF THE INVENTION

This application claims the priority of Japanese Patent Application No. 6-191981 filed on Jul. 22, 1994 which is incorporated herein by reference.

1. Field of the Invention

The present invention relates to a hydrogen-absorbing alloy electrode for metal hydride alkaline batteries.

2. Description of the Prior Art

Hydrogen-absorbing alloys capable of reversibly absorbing and discharging hydrogen have been developed actively in recent years. Metal hydride alkaline batteries utilizing these hydrogen-absorbing alloys as negative electrode active material have been attracting much attention and are expected to become a mainstream in the next generation alkaline batteries, since they are lighter and can be provided with higher capacity as compared with lead, nickel-cadmium and like conventional batteries.

A process for producing hydrogen-absorbing alloy electrodes for metal hydride alkaline batteries comprises the steps of pulverizing casted blocks of a hydrogen-absorbing alloy into a powder, mixing the hydrogen-absorbing alloy powder with a binder and other ingredients to obtain a paste, coating or filling a collector with the paste and solidifying the paste by heat drying. This process is known as "paste process".

However, this process has the following problems (A) due to the presence of a binder in the obtained electrode and (B) to the hydrogen-absorbing alloy powder being produced by casting and pulverization.

(A) Problems due to the presence of a binder

1. The presence of a binder on the surface of particles of the hydrogen-absorbing alloy powder obstructs formation of 3-phase interfaces between the gas (oxygen), liquid (electrolyte) and solid (hydrogen-absorbing alloy particles), thereby retarding the reduction of the oxygen with hydrogen that converts the oxygen into water. As a result, the inside pressure of the battery increases and the electrolyte is eventually discharged together with oxygen from the battery, so that the battery has poor charge-discharge cycle characteristics. Besides, it becomes necessary to charge with a small current in order to suppress the inside pressure of the battery, so that the battery cannot be charged at a high rate.

2. The presence of a binder between particles of the hydrogen-absorbing alloy lowers the electronic conductivity between the particles, thus deteriorating the high-rate discharge characteristics of the electrode.

3. It becomes necessary to decrease the amount of the hydrogen-absorbing alloy powder to fill up the electrode by the volume occupied by the binder, resulting in a low packing density.

(B) Problems due to casting and pulverization process

1. Casting and pulverization requires a long time to cool a hydrogen-absorbing alloy melt, whereby the same elements contained therein tend to flock together and segregation phases tend to form. The metal structure thus formed non-uniformly has poor corrosion resistance. Then, the surface of the alloy is oxidized (corroded) to form an inert layer, which deteriorates the cycle characteristics.

2. A separate pulverization process becomes necessary, which makes complex the manufacturing process of negative electrodes.

To solve the problems (A) due to the presence of a binder, there has been developed a hydrogen-absorbing alloy electrode obtained by casting and pulverizing the hydrogen-absorbing alloy and then bonding the resulting powder by sintering.

However, this method cannot solve the problems (B) due to casting and pulverization process. Furthermore, it is very difficult to sinter the hydrogen-absorbing alloy particles obtained by casting and pulverization process, since the particles tend to contact with each other while forming "area contact" and hence heat diffuses upon sintering.

In order to solve the problems (B) due to casting and pulverization process, Japanese Patent Application Laid-open No. 116655/1991 proposes a hydrogen-absorbing alloy electrode obtained by the successive steps of preparing spherical or nearly spherical particles of the hydrogen-absorbing alloy by centrifugal spraying (rotary disc process) or gas atomization, adding a binder to the powder to form a paste, coating or filling a substrate (collector) with the paste and pressing the resulting composite.

However, this hydrogen-absorbing alloy electrode cannot solve the problems (A) due to the presence of a binder.

U.S. Pat. No. 5,219,678 discloses a hydrogen-absorbing alloy electrode comprising a hydrogen-absorbing alloy powder obtained by centrifugal spraying or gas atomization and having an average particle diameter of 1 to 100 µm and containing at least 70% of particles having a diameter ranging within ±10% of the average diameter.

However, according to a study made by the present inventors, use of a hydrogen-absorbing alloy powder having such a narrow particle size distribution, which decreases the packing density, decreases the discharge capacity and makes it difficult to obtain a metal hydride alkaline battery having excellent high-rate discharge characteristics and a long battery life.

SUMMARY OF THE INVENTION

Accordingly, an object of the present invention is to provide a hydrogen-absorbing alloy electrode that can give a metal hydride alkaline battery having excellent high-rate discharge characteristics and a long life.

The present invention provides a hydrogen-absorbing alloy electrode obtained by coating or filling a collector with a hydrogen-absorbing alloy powder consisting essentially of spherical particles and/or nearly spherical particles and then sintering the powder, said powder having an average particle diameter of 30 to 70 µm and containing 5 to 30% by volume of particles having a diameter of at least 2 times the average diameter and 10 to 40% by volume of particles having a diameter of not more than ½ of the average diameter.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings wherein.

DETAILED DESCRIPTIONS OF THE PREFERRED EMBODIMENTS

Figure 1:
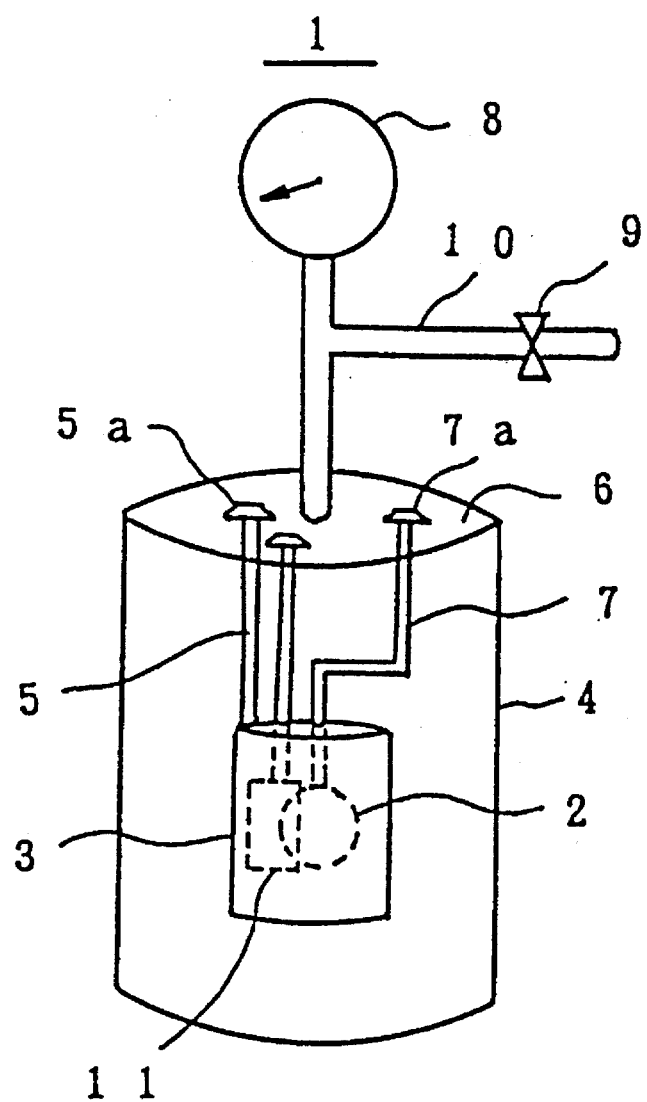
FIG. 1 is a schematic perspective view of one of the test cells prepared in Examples.

The hydrogen-absorbing alloy powder used in the invention consists essentially of spherical particles and/or nearly spherical particles (hereinafter these spherical particles and/or nearly spherical particles are referred to simply as "spherical particles") having an average particle diameter of 30 to 70 μm. With the average particle diameter deviating from this range, both the high-rate discharge characteristics and the cycle characteristics become worse. Besides, an average particle diameter of less than 30 μm causes the hydrogen-absorbing alloy to be oxidized and degraded markedly, which deteriorates the contactivity between the particles, and hence the powder becomes difficult to sinter; while that exceeding 70 μm tends to cause the separator to break, thereby causing an internal short circuit.

The hydrogen-absorbing alloy powder used in the invention contains 5 to 30% based on the total volume thereof of spherical particles having a diameter of at least 2 times the average diameter. If the volume of spherical particles having a diameter of at least 2 times the average diameter is less than 5% of the total particle volume, the hydrogen-absorbing alloy powder, having a large specific area, will be degraded by oxidation, so that the particles of the hydrogen-absorbing alloy cannot closely contact with each other and hence the conductivity of the electrode becomes worse. As a result, the battery has poor high-rate discharge characteristics and a short life due to decrease of charge-discharge capacity. On the other hand, if the volume of spherical particles having a diameter of at least 2 times the average diameter exceeds 30% of the total particle volume, the packing density will decrease so that the reactive area of the electrode decreases. As a result, the battery has poor high-rate discharge characteristics and a short life due to decrease of charge-discharge capacity.

The hydrogen-absorbing alloy powder used in the invention further contains 10 to 40% based on the total volume thereof of spherical particles having a diameter of not more than ½ of the average diameter. If the volume of spherical particles having a diameter of not more than ½ of the average diameter is less than 10% of the total particle volume, the packing density will decrease so that the reactive area of the electrode decreases. As a result, the battery has poor high-rate discharge characteristics and a short life due to decrease of charge-discharge capacity. On the other hand, if the volume of spherical particles having a diameter of not more than ½ of the average diameter exceeds 40% of the total particle volume, the hydrogen-absorbing alloy powder, having a large specific area, will be degraded by oxidation, so that the particles of the hydrogen-absorbing alloy cannot closely contact with each other and hence the conductivity of the electrode becomes worse. As a result, the battery has poor high-rate discharge characteristics and a short life due to decrease of charge-discharge capacity.

The hydrogen-absorbing alloy electrode according to the present invention can be prepared for example as follows. A hydrogen-absorbing alloy powder consisting essentially of spherical particles and obtained by centrifugal spraying or gas atomization is kneaded with a thickener solution obtained by dissolving a thickener in water or an organic solvent, to give a paste. A collector is coated or filled with the paste thus prepared and then burned to sinter the hydrogen-absorbing alloy powder and remove the thickener by decomposition.

Although it is considered to employ, instead of the above sintering process, a process of preparing a hydrogen-absorbing alloy electrode by heat drying the paste applied on or having permeated in the collector, this process cannot solve the problems (A) due to the presence of a binder and is therefore not acceptable.

The centrifugal spraying process comprises jetting a hydrogen-absorbing alloy melt through a multiplicity of small holes provided on the side wall of a disc rotating at high speed and dispersing the jetted melts finely and, at the same time, cooling the dispersed melts quickly to solidify them. The gas atomization process comprises spraying a hydrogen-absorbing alloy melt by extruding it through fine holes under a pressure exerted by an inert gas such as argon and then solidifying the extruded melts. Here, a what is known as a "roll process" which comprises dripping a hydrogen-absorbing alloy melt onto the peripheral surface of a rotating roll is not applicable, since the melt solidifies, while losing heat through the roll, into flakes that never resemble spherical or nearly spherical particles.

The sintering of the hydrogen-absorbing alloy powder can be sufficiently carried out at a temperature of 800 to 1,000° C. for 0.5 to 2 hours. For sintering pulverized alloys, it is necessary to employ the conditions of a high temperature of at least 1,050° C. and a long time of about 6 hours. However, in the present invention, utilizing a spherical hydrogen-absorbing alloy powder, the sintering can be conducted at a relatively low temperature and in a short period of time.

Examples of the collector used in the invention are conductive porous metals, e.g. thin perforated plates of nickel or nickel-plated iron, foamed nickel, sintered body of nickel fibers, nickel fiber mat, nickel net and nickel-plated iron net.

The electrode of the present invention, utilizing the above hydrogen-absorbing alloy powder consisting essentially of spherical particles having an appropriate average diameter and particle size distribution, develops, when used as negative electrode of metal hydride alkaline batteries, excellent high-rate discharge characteristics and charge-discharge cycle characteristics.

EXAMPLES

Other features of the invention will become apparent in the course of the following descriptions of exemplary embodiments which are given for illustration of the invention and are not intended to be limiting thereof.

Preparation Examples 1 through 5

[Preparation of hydrogen-absorbing alloy powder]

There were mixed Mm (Misch metal), Ni, Co, Al and Mn in a molar ratio of 1.0:3.2:1.0:0.2:0.6 and the mixture was melted in a high-frequency induction heat melting furnace at 1,500° C. to yield a hydrogen-absorbing alloy melt. The hydrogen-absorbing alloy melt was then solidified by the known gas atomization process that comprised extruding the melt through fine holes under a pressure of argon and spraying the extruded melts (hereinafter the same will apply to all of the gas atomization processes used in the Examples). From the obtained particles, there were prepared through sieves having various openings hydrogen-absorbing alloy powders M1 through M5 (composition formula: $MmNi_{3.2}Co_{1.0}Al_{0.2}Mn_{0.6}$) having an average particle diameter of about 20 μm, about 30 μm, about 50 μm, about 70 μm and about 80 μm, respectively, and all containing 10% by volume of particles having a diameter of at least 2 times the average diameter and 20% by volume of particles having a diameter of not more than ½ of the average diameter. The average particle diameter was determined with a Microtruck particle size analyzer (made by Leeds & Northrup Co.) by a laser-diffraction method (which comprises determining the particle size distribution utilizing Fraunhofer diffraction phenomenon with a light source of laser). The average particle diameter is defined by the following formula.

Average particle diameter $Mv = \Sigma (V_i D_i)/\Sigma V_i$ (volume-weighted mean diameter)

where $D_i$=representative diameter of each fraction (the diameter of particles of fraction center), $V_i$=content by volume of each fraction

[Fabrication of test cell]

Ten grams each of the hydrogen-absorbing alloy powders M1 through M5 were separately dispersed in 1 g of a 5% by weight aqueous solution of PEO (polyethylene oxide), to give pastes. Each of the pastes was heated and rolled into a plate, which was then cut to a prescribed size. The obtained discs were sintered in an electric oven at a temperature of 900° C. under an atmosphere of argon, to yield hydrogen-absorbing alloy electrodes E1 through E5.

Test cells were fabricated using each of the hydrogen-absorbing alloy electrodes as test electrode, a sintered nickel cylinder having a sufficiently larger electrochemical capacity than that of the test electrode as counter electrode and a sintered nickel plate as reference electrode. A 30% by weight aqueous potassium hydroxide solution was used as electrolyte.

FIG. 1 is a schematic perspective view of the test cell thus fabricated. In the FIGURE, the test cell 1 consists of a disc-like hydrogen-absorbing alloy electrode (test electrode) 2, a cylindrical sintered nickel electrode (counter electrode) 3 having a sufficiently larger electrochemical capacity than that of the test electrode 2, a plate-like sintered nickel electrode (reference electrode) 11, a non-conductive closed case (of polypropylene) 4 and other parts.

The sintered nickel electrode 3 is held by a positive electrode lead 5 connected to the top surface 6 of the closed case 4. The hydrogen-absorbing alloy electrode 2 is held, in such a position as to hang vertically at near the center of the hollow cylinder of the sintered nickel electrode 3, by a negative electrode lead 7 connected to the top surface 6 of the closed case 4.

The ends of the positive electrode lead 5 and negative electrode lead 7 are, penetrating the top surface 6 of the closed case 4, exposed outwardly and connected to a positive electrode terminal 5a and a negative electrode terminal 7a, respectively.

The hydrogen-absorbing alloy electrode 2 and the sintered nickel electrode 3 are immersed in an alkaline electrolyte (30% by weight aqueous potassium hydroxide solution; not shown). The space above the alkaline electrolyte is filled with nitrogen so that a prescribed pressure is applied to the hydrogen-absorbing alloy electrode 2.

A relief pipe 10 equipped width a pressure gauge 8 and a relief valve 9 is, to prevent the internal pressure of the closed case 4 from increasing beyond a prescribed level, installed on the central part of the top surface 6 of the closed case 4.

Test for Degree of Activation

Each of the test cells was charged at a current density of 50 mA/g for 8 hours and then discharged at a current density of 200 mA/g or 50 mA/g to a voltage of 1.0 V and the discharge capacities for the two current densities were obtained. The degree of activation was calculated by substituting the discharge capacities into the following formula. The results are shown in FIG. 2.

$$\text{Degree of activation (\%)} = \frac{\text{Discharge capacity at 200 mA/g}}{\text{Discharge capacity at 50 mA/g}} \times 100$$

Figure 2:
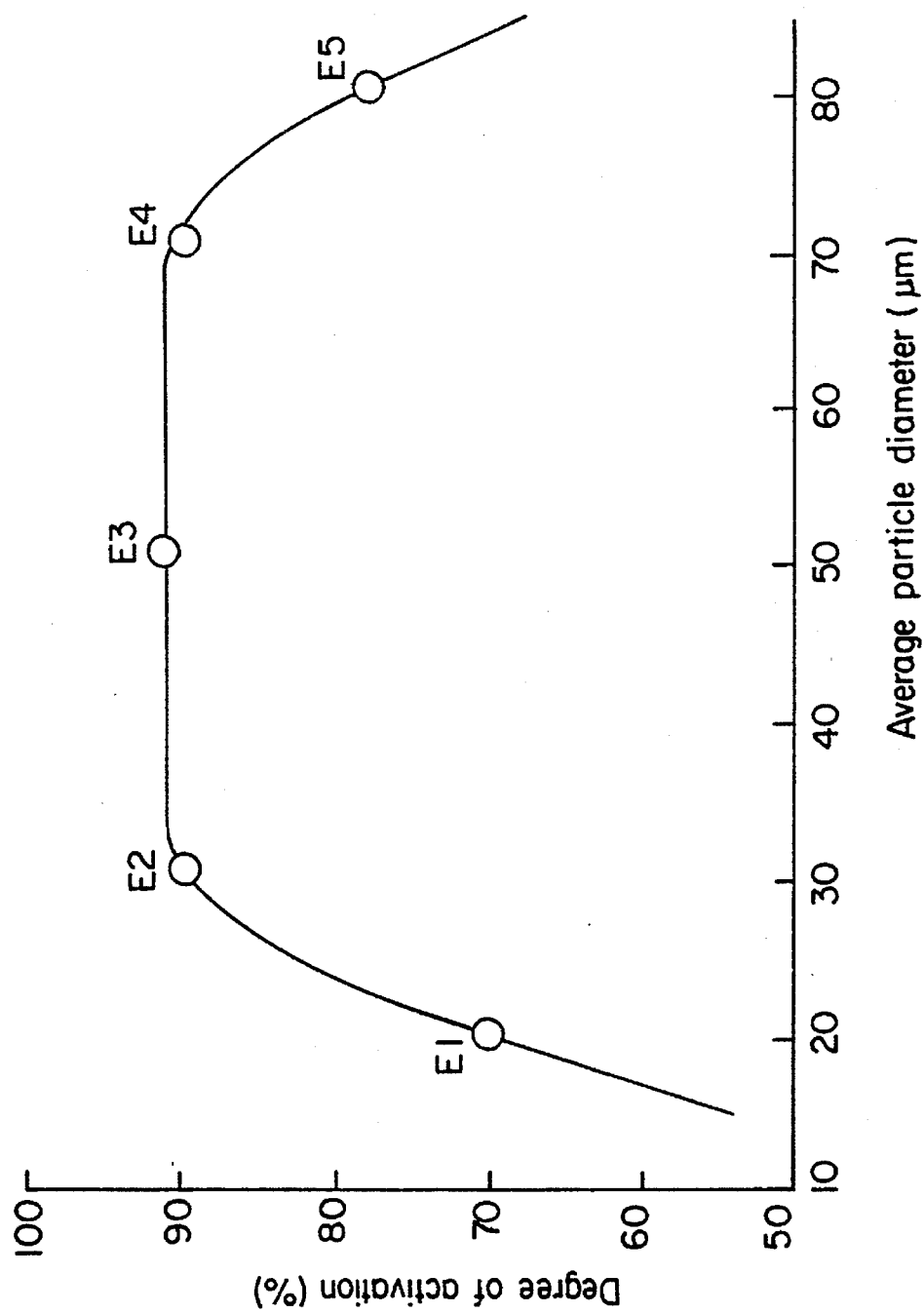
FIG. 2 is a graph showing the relationship between the average particle diameter of a hydrogen-absorbing alloy powder and the degree of activation of the hydrogen-absorbing alloy electrode using the powder.

FIG. 2 is a graph showing the relationship between the average particle diameter of the hydrogen-absorbing alloy powder and the degree of activation of the hydrogen-absorbing alloy electrode, with the ordinate representing the degree of activation (%) of the hydrogen-absorbing alloy electrode and the abscissa the average particle diameter (μm) of the hydrogen-absorbing alloy powder. As seen from FIG. 2, the electrode E1 using a hydrogen-absorbing alloy powder having an average particle diameter of less than 30 μm and the electrode E5 using that with an average diameter exceeding 70 μm have lower degree of activation as compared with the electrodes E2 through E4 with the average diameter falling within a range of 30 to 70 μm. The low degree of activation observed with an average particle diameter of less than 30 μm is due to the low conductivity of the electrode as caused by insufficient contact of hydrogen-absorbing alloy particles, having been oxidized, with each other. The low degree of activation observed with an average particle diameter exceeding 70 μm is due to the decreased reactive area of the electrode as caused by low packing density.

[Preparation of Nickel Hydride Alkaline Battery]

AA-size nickel hydride alkaline batteries B1 through B5 were prepared using the following positive electrode, negative electrodes and alkaline electrolyte. A polyamide nonwoven fabric was used as separator, which was impregnated with the alkaline electrolyte.

Negative Electrodes

Pastes were prepared by dispersing 100 parts by weight each of the hydrogen-absorbing alloy powders M1 through M5 in 20 parts by weight of a 5% by weight aqueous polyethylene oxide (PEO) solution as thickener. The pastes were each applied on both sides of a collector, dried and then burned in an electric oven at 900° C. under an atmosphere of argon or 1 hour to sinter the hydrogen-absorbing alloy powders while the PEO was being removed by decomposition. Thereafter, the sintered articles were cut to a prescribed size and then rolled to give negative electrodes.

Positive Electrode

A sintered substrate having a porosity of 90% was impregnated with an aqueous nickel nitrate solution containing cobalt nitrate and zinc nitrate, and then immersed in an aqueous sodium hydroxide solution to precipitate nickel hydroxide, cobalt hydroxide and zinc hydroxide. This procedure was repeated 10 times. Thereafter, the obtained composite was washed with water and dried, to give a sintered nickel electrode comprising the substrate with its pores filled with active materials such as nickel hydroxide.

Alkaline Electrolyte

A 30% by weight aqueous KOH solution was prepared.

Figure 3:
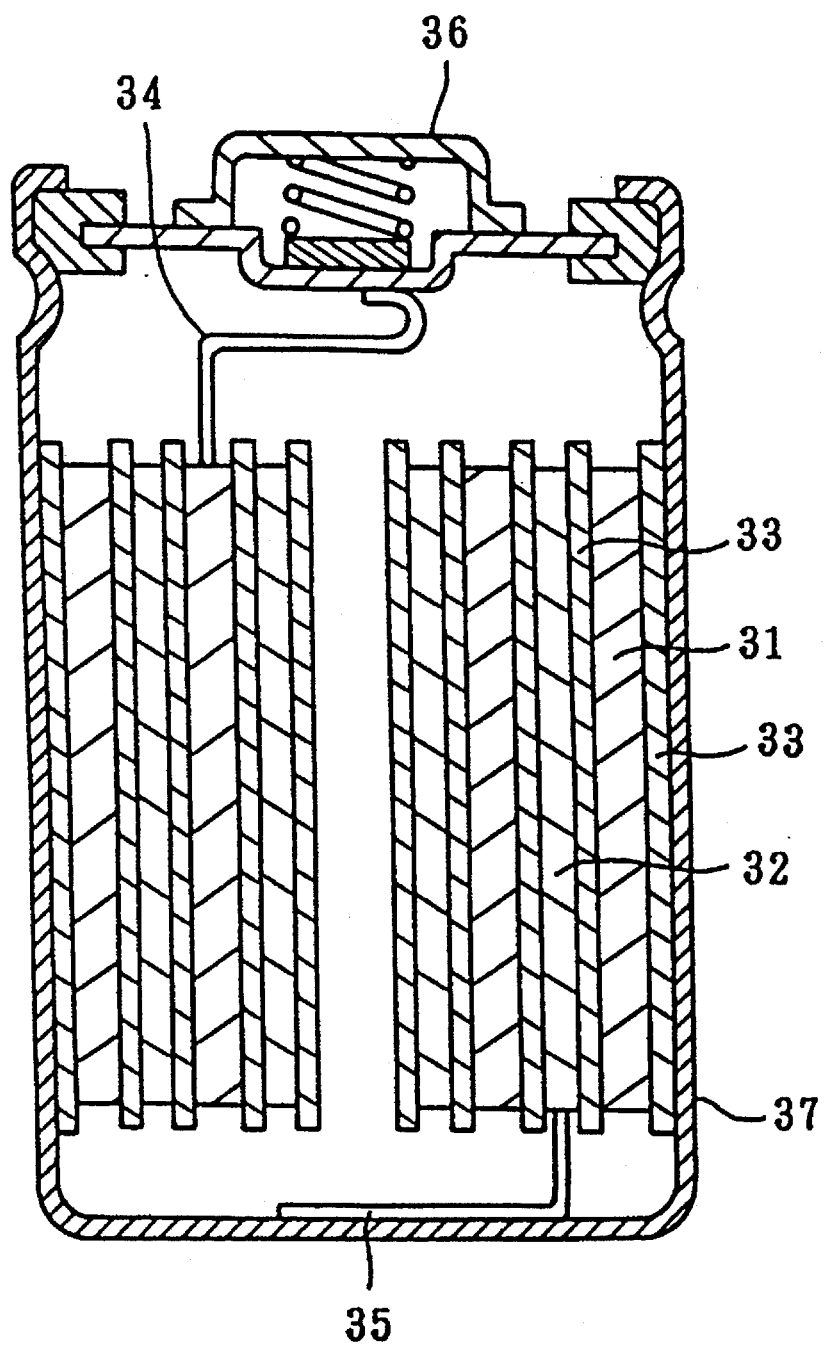
FIG. 3 is a cross-sectional view of one of the nickel-metal hydride alkaline batteries prepared in Examples.

FIG. 3 is a cross-sectional view of the nickel hydride alkaline battery fabricated. In the FIGURE, the battery B consists of a positive electrode 31, a negative electrode 32, a separator 33 separating the two electrodes, a positive electrode lead 34, a negative electrode lead 35, a positive electrode outside terminal 36, a negative electrode can 37 and other parts. The positive and negative electrodes 31 and 32 are, while being spirally wound via the separator 33 into which the alkaline electrolyte has been injected, housed in the negative electrode can 37. The positive electrode 31 is connected to the positive electrode outside terminal 36 via the positive electrode lead 34 and the negative electrode 32 to the negative electrode can 37 via the negative electrode lead 35, so that the chemical energy generated in the battery can be taken out as electric energy.

Charge-discharge Cycle Test

Figure 4:
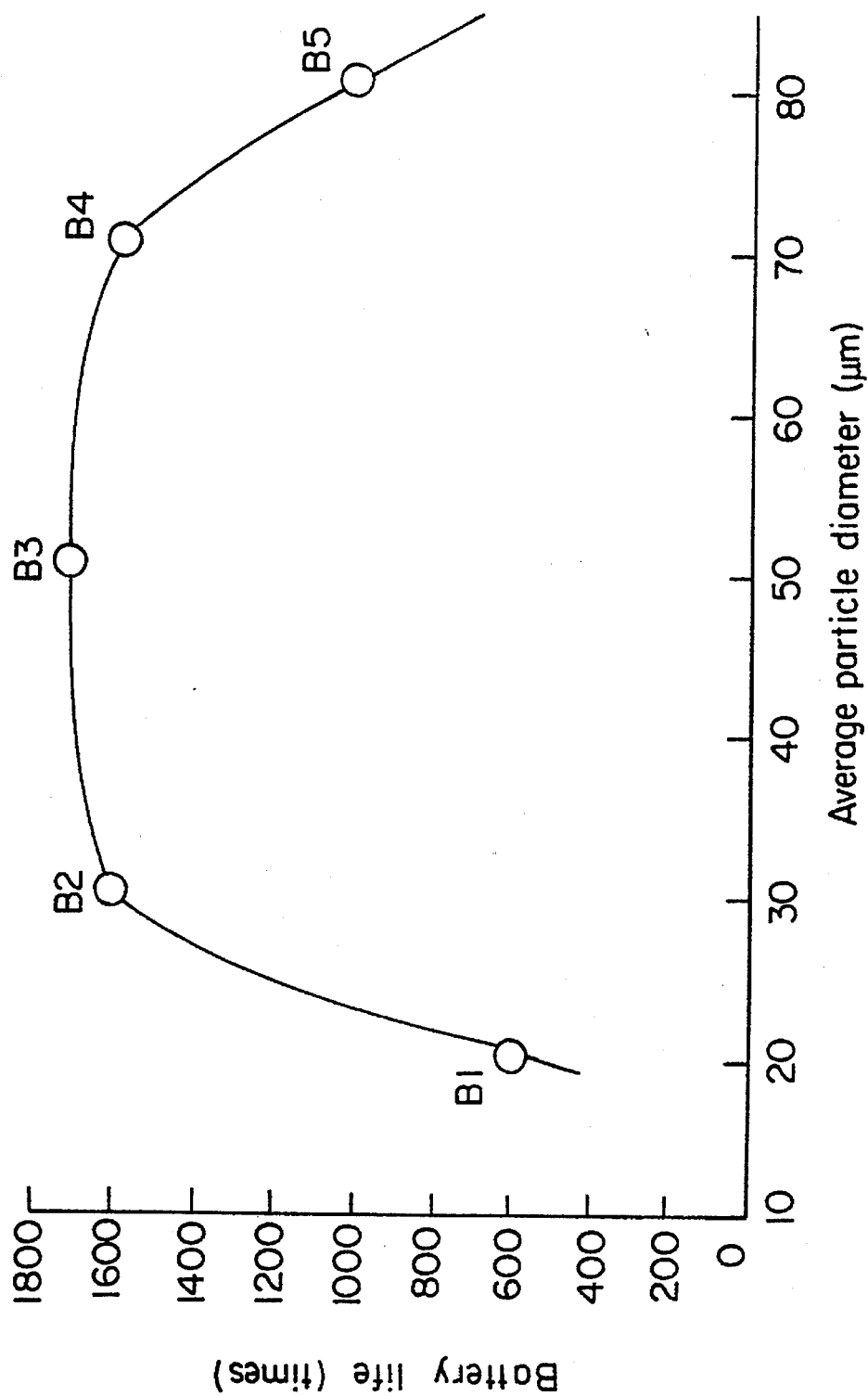
FIG. 4 is a graph showing the relationship between the average particle diameter of a hydrogen-absorbing alloy powder and the life of the obtained battery.

The batteries B1 through B5 were subjected to repeated cycles of charging at a current of 1.5 C up to a voltage of 10 mV below the maximum voltage and discharging at 1.5 C to a voltage of 1.0 V, to test for the battery life. The results are shown in FIG. 4. The time point where the discharge capacity decreases to 50% of the initial capacity was taken as the life of the battery and expressed in terms of number of cycles (times) repeated until that point was reached.

FIG. 4 is a graph showing the relationship between the average particle diameter of hydrogen-absorbing alloy powder and the battery life, with the ordinate representing the battery life (times) and the abscissa the average particle diameter (μm). As seen from FIG. 4, the battery B1 using a hydrogen-absorbing alloy powder having an average particle diameter of less than 30 μm and the battery B5 using that with an average diameter exceeding 70 μm have each a shorter battery life as compared with the batteries B2 through B4 with the average diameter being within a range of 30 to 70 μm. The short battery lives observed with an average particle diameter of less than 30 μm is due to the decreased charge-discharge capacity as caused by marked degradation by oxidation of hydrogen-absorbing alloy powder. The short battery life observed with the average particle diameter exceeding 70 μm is due to the decreased charge-discharge capacity as caused by low packing density.

Tables 1 and 2 summarize the average particle diameter and particle size distribution of the hydrogen-absorbing alloy powders M1 through M5 and the codings of electrodes and batteries prepared therefrom. Tables 1 and 2 also show the average particle diameter and particle size distribution of the hydrogen-absorbing alloy powders M6 through M13 and the codings of electrodes and batteries therefrom, prepared in Preparation Examples 6 through 13 to be described later herein.

TABLE 1

| | Sieve (mesh) | | | | | | |
|---|---|---|---|---|---|---|---|
| | Less than 100# | 100 to 140# | 140 to 200# | 200 to 280# | 280 to 400# | 400 to 500# | More than 500# |
| | Particle diameter (μm) | | | | | | |
| Alloy powder | 150 or more | 150 to 107 | 107 to 75 | 75 to 53 | 53 to 38 | 38 to 25 | 25 or less |
| M1 | | | | | 10 | 11 | 79 |
| M2 | | | | 8 | 7 | 43 | 42 |
| M3 | | | 11 | 22 | 27 | 20 | 20 |
| M4 | | 13 | 14 | 27 | 22 | 16 | 8 |
| M5 | 9 | 2 | 24 | 21 | 20 | 15 | 9 |
| M6 | | | 11 | 11 | 37 | 36 | 5 |
| M7 | | | 11 | 13 | 36 | 30 | 10 |
| M8 | | | 11 | 41 | 7 | 5 | 40 |
| M9 | | | 11 | 44 | 3 | 3 | 42 |
| M10 | | | 3 | 33 | 33 | 11 | 20 |
| M11 | | | 5 | 30 | 31 | 14 | 20 |
| M12 | | | 30 | 1 | 1 | 48 | 20 |
| M13 | | | 32 | 0 | 0 | 48 | 20 |

TABLE 2

| Alloy powder | Content of thick particles[1] (%) | Content of fine particles[2] (%) | Average particle diameter (μm) | Code of electrode | Code of battery |
|---|---|---|---|---|---|
| M1 | 10 | 20 | 20.7 | E1 | B1 |
| M2 | 10 | 20 | 30.4 | E2 | B2 |
| M3 | 10 | 20 | 49.9 | E3 | B3 |
| M4 | 10 | 20 | 70.2 | E4 | B4 |
| M5 | 10 | 20 | 80.8 | E5 | B5 |
| M6 | 10 | 5 | 50.5 | E6 | B6 |
| M7 | 10 | 10 | 50.1 | E7 | B7 |
| M8 | 10 | 40 | 50.9 | E8 | B8 |
| M9 | 10 | 42 | 50.6 | E9 | B9 |
| M10 | 3 | 20 | 49.4 | E10 | B10 |
| M11 | 5 | 20 | 49.4 | E11 | B11 |
| M12 | 30 | 20 | 51.0 | E12 | B12 |
| M13 | 32 | 20 | 51.8 | E13 | B13 |

[1]Particles having a diameter of at least 2 times the average diameter.
[2]Particles having a diameter of not more than ½ of the average diameter.

Preparation Examples 6 through 9

There were mixed Mm, Ni, Co, Al and Mn in a molar ratio of 1.0:3.2:1.0:0.2:0.6, and the mixture was melted in a high-frequency induction heat melting furnace at 1,500° C., to yield a hydrogen-absorbing alloy melt. The melt was solidified by gas atomization. The solidified matter was processed through sieves having various openings into hydrogen-absorbing alloy powders M6 through M9 consisting essentially of spherical particles having an average diameter of about 50 μm and containing 10% by volume of particles having a diameter of at least 2 times the average diameter and 5, 10, 40 and 42% by volume, respectively, of particles having a diameter of not more than ½ of the average diameter (composition formula: $MmNi_{3.2}Co_{1.0}Al_{0.2}Mn_{0.6}$).

Preparation Examples 1 through 5 were repeated except that the above hydrogen-absorbing alloy powders M6 through M9 were used, to prepare test cells and batteries B6 through B9 (nickel hydride alkaline batteries). The hydrogen-absorbing alloy electrodes E6 through E9 used for the test cells were tested for -the degree of activation and the batteries for the life. The test conditions for the degree of activation and the battery life are the same as before. FIG.

Figure 5:
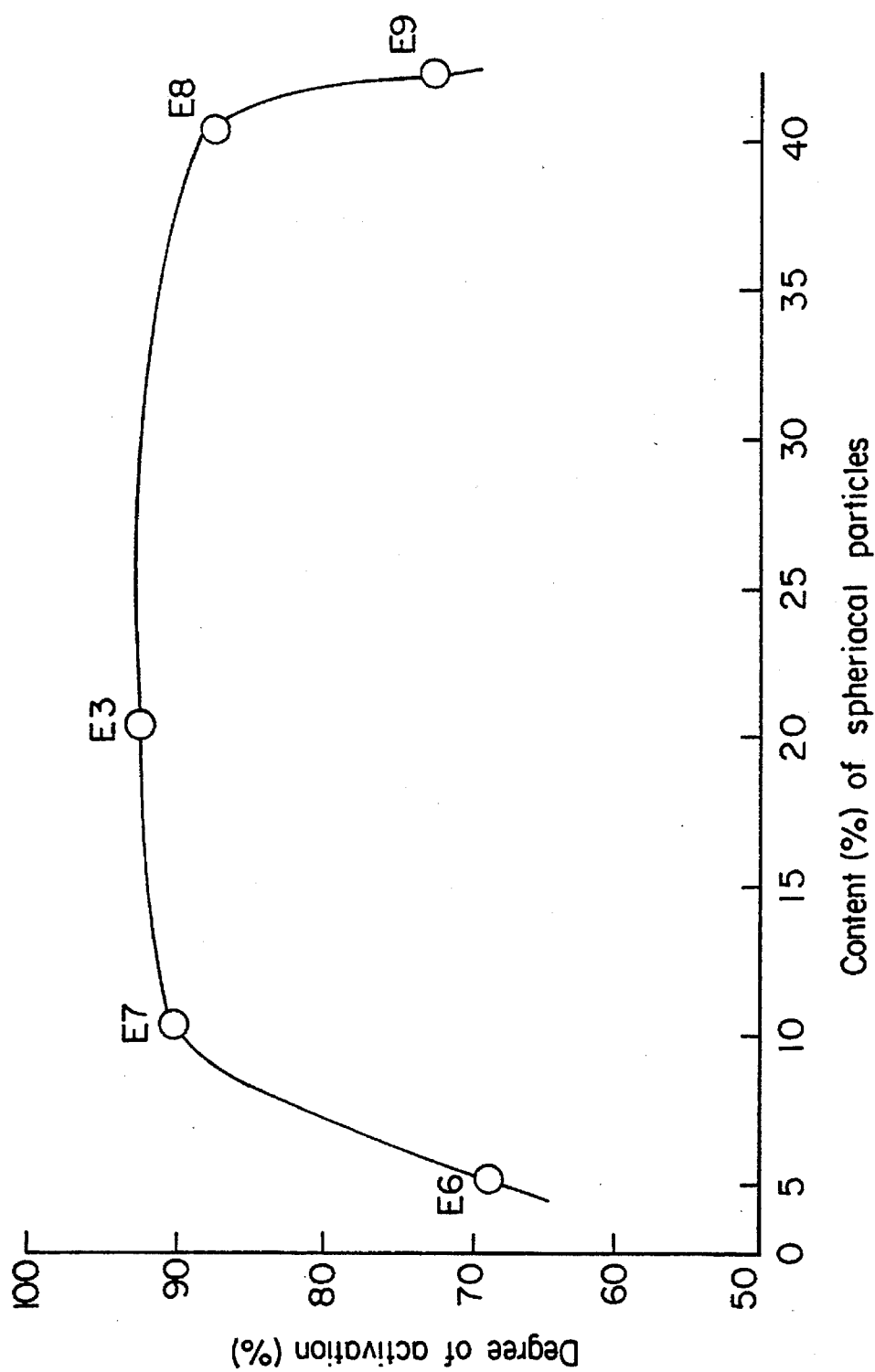
FIG. 5 is a graph showing the relationship between the content of spherical particles having a diameter of not more than ½ of the average diameter in a hydrogen-absorbing alloy powder and the degree of activation of the hydrogen-absorbing alloy electrode.
Figure 6:
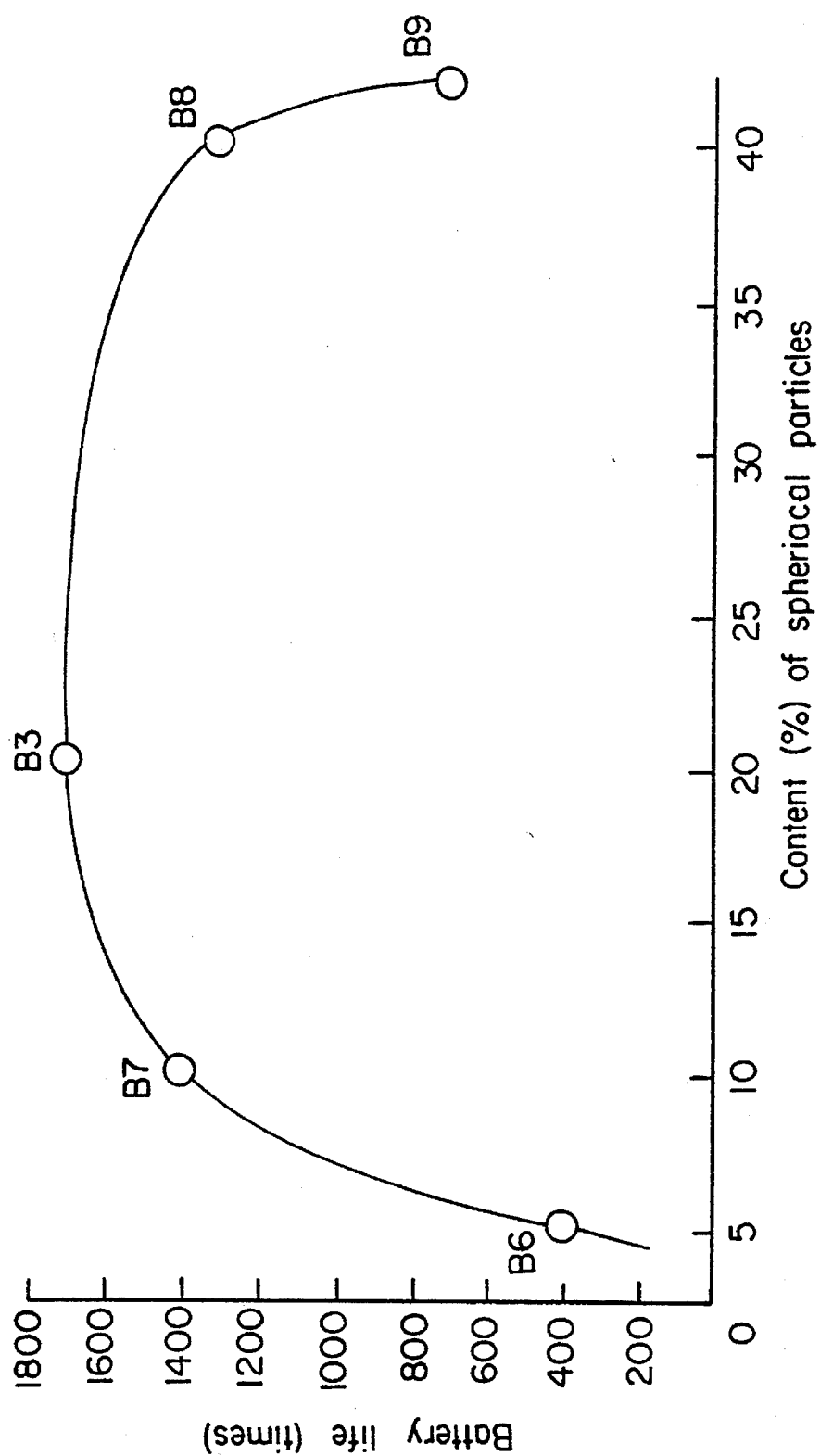
FIG. 6 is a graph showing the relationship between the content of spherical particles having a diameter of not more than ½ of the average diameter in a hydrogen-absorbing alloy powder and the battery life.

5 shows the degrees of activation of the hydrogen-absorbing alloy electrodes E6 through E9 and FIG. 6 the lives of the batteries B6 through B9. FIGS. 5 and 6 also show those obtained with the electrode E3 and the battery B3 described before.

As seen from FIG. 5, the electrode E6 using a hydrogen-absorbing alloy powder containing less than 10% of spherical particles having a diameter of not more than ½ of the average diameter and the electrode E9 containing more than 40% of spherical particles having a diameter of not more than ½ of the average diameter have a lower degree of activation and hence have poorer high-rate discharge characteristics as compared with the electrodes E7, E3 and E8 using a hydrogen-absorbing alloy powder containing 10 to 40% of spherical particles having a diameter of not more than ½ of the average diameter. The low degree of activation observed with the above content being less than 10% is due to the decreased reactive area of the electrode as caused by low packing density. The low degree of activation observed with the content exceeding 40% is due to the low conductivity of the electrode as caused by insufficient contact of hydrogen-absorbing alloy particles, having been oxidized, with each other.

Further as seen from FIG. 6, the battery B6 using a hydrogen-absorbing alloy powder containing less than 10% of spherical particles having a diameter of not more than ½ of the average diameter and the battery B9 using a hydrogen-absorbing alloy powder containing more than 40% of spherical particles having a diameter of not more than ½ of the average diameter have a shorter battery life as compared with the batteries B7, B3 and B8 using a hydrogen-absorbing alloy powder containing 10 to 40% of spherical particles having a diameter of not more than ½ of the average diameter. The short battery lives observed with the content being less than 10% is due to the decreased charge-discharge capacity as caused by low packing density. The short battery lives observed with the content exceeding 40% is due to the decreased charge-discharge capacity as caused by marked degradation by oxidation of hydrogen-absorbing alloy powder.

Preparation Examples 10 through 13

There were mixed Mm, Ni, Co, Al and Mn in a molar ratio of 1.0:3.2:1.0:0.2:0.6, and the mixture was melted in a high-frequency induction heat melting furnace at 1,500° C., to yield a hydrogen-absorbing alloy melt. The melt was solidified by gas atomization. The solidified matter was processed through sieves having various openings into hydrogen-absorbing alloy powders M10 through M13 comprising spherical particles having an average diameter of about 50 μm and containing 3, 5, 30 and 32% by volume, respectively, of particles having a diameter of at least 2 times the average diameter and 20% by volume of particles having a diameter of not more than ½ of the average diameter (composition formula: $MmNi_{3.2}Co_{1.0}Al_{0.2}Mn_{0.6}$).

Figure 7:
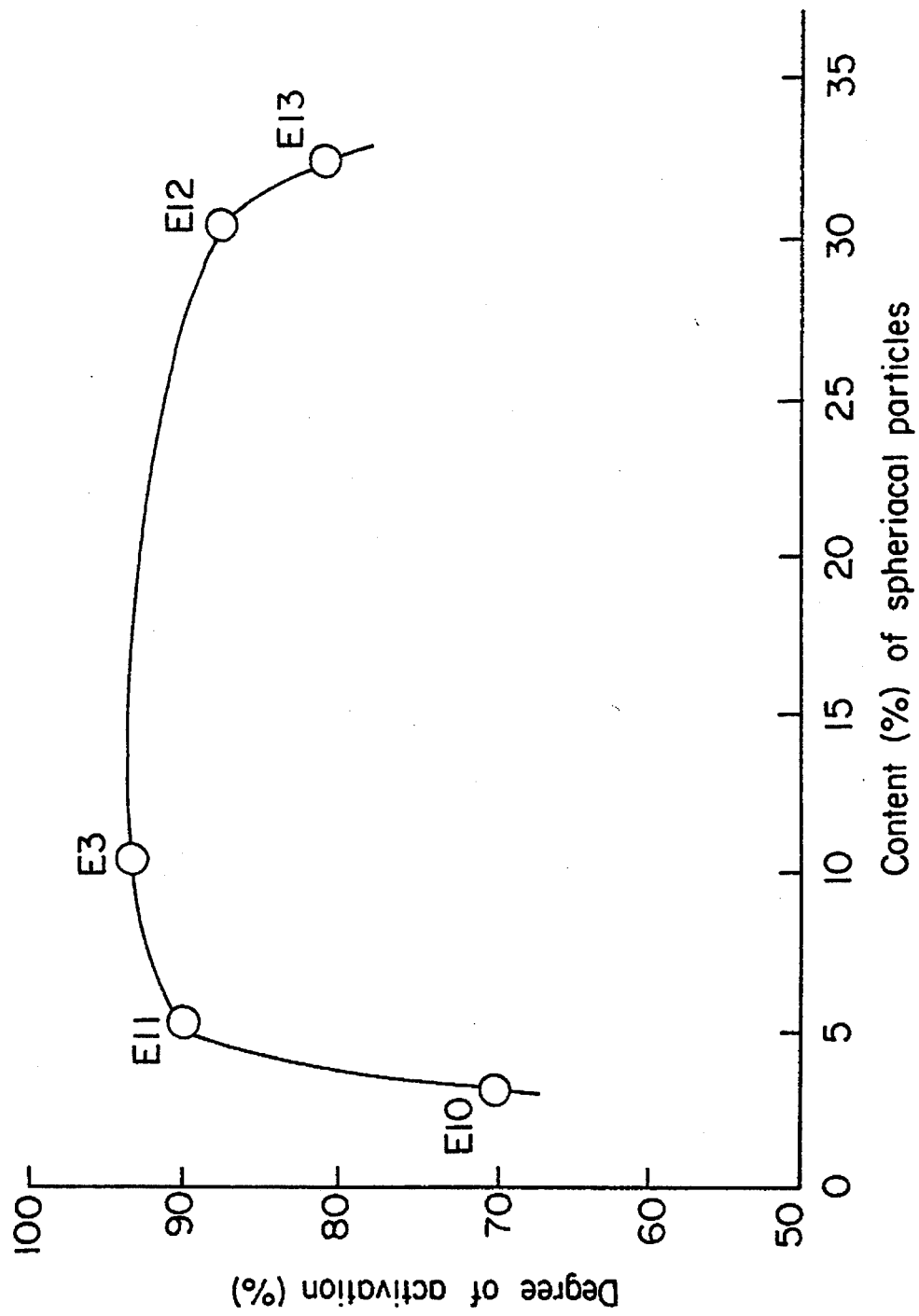
FIG. 7 is a graph showing the relationship between the content of spherical particles having a diameter of at least 2 times the average diameter in a hydrogen-absorbing alloy powder and the degree of activation of the hydrogen-absorbing alloy electrode.
Figure 8:
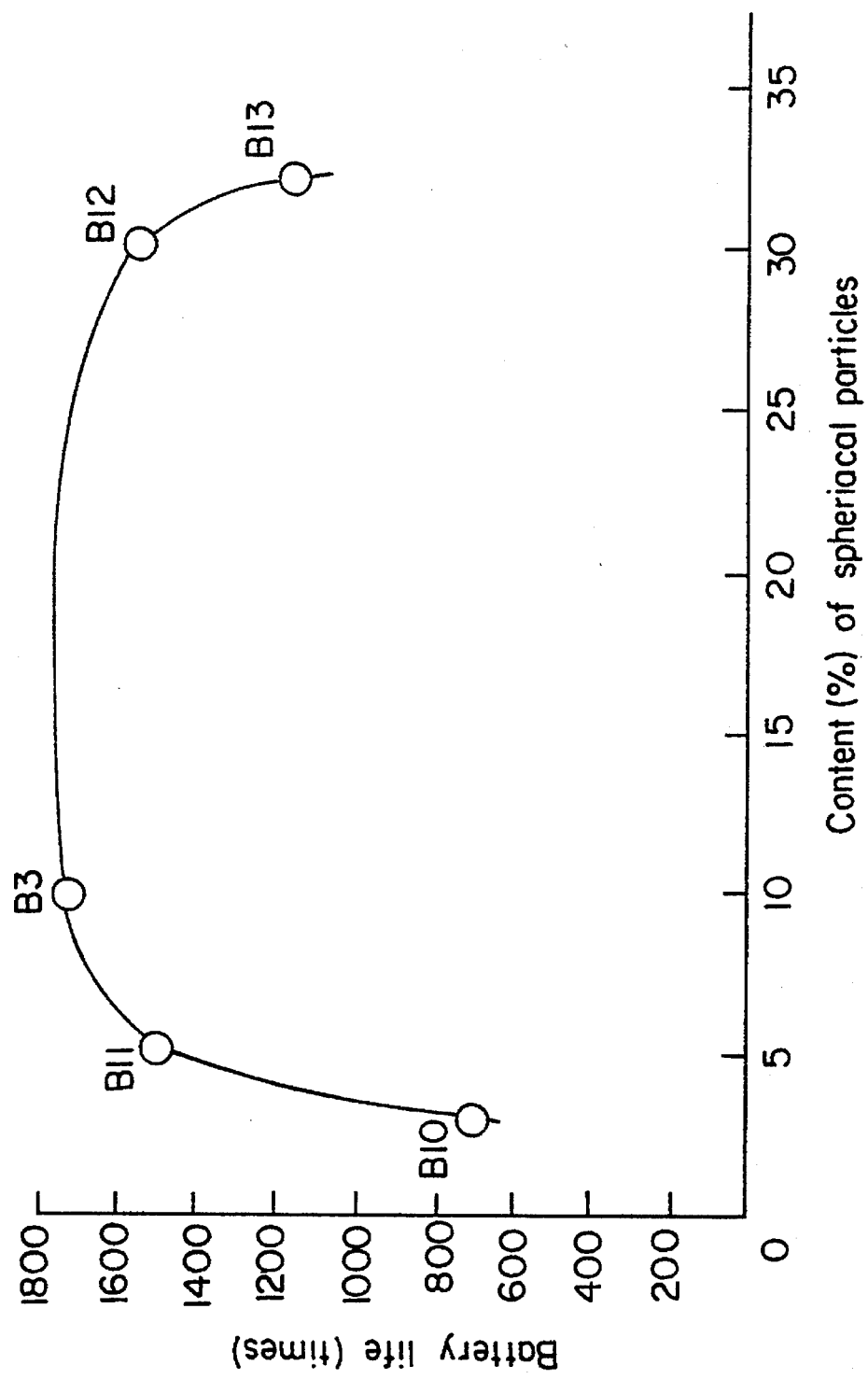
FIG. 8 is a graph showing the relationship between the content of spherical particles having a diameter of at least 2 times the average diameter in a hydrogen-absorbing alloy powder and the battery life.

Preparation Examples 1 through 5 were repeated except that the above hydrogen-absorbing alloy powders M10 through M13 were used, to prepare test cells and batteries B10 through B13 (nickel hydride alkaline batteries). The hydrogen-absorbing alloy electrodes E10 through E13 used for the test cells were tested for the degree of activation and the batteries for the life. The test conditions for the degree of activation and the battery life are the same as before. FIG. 7 shows the degrees of activation of the hydrogen-absorbing alloy electrodes E10 through E13 and FIG. 8 the lives of the batteries B10 through B13. FIGS. 7 and 8 also show the results obtained with the electrode E3 and the battery B3 described before.

As seen from FIG. 7, the electrode E10 using a hydrogen-absorbing alloy powder containing less than 5% of spherical particles having a diameter of at least 2 times the average diameter and the electrode E13 containing more than 30% of spherical particles having a diameter of at least 2 times the average diameter have a lower degree of activation and hence have poorer high-rate discharge characteristics as compared with the electrodes E11, E3 and E12 using a hydrogen-absorbing alloy powder containing 5 to 30% of spherical particles having a diameter of at least 2 times the average diameter. The low degree of activation observed with the above content being less than 5% is due to the low conductivity of the electrode as caused by insufficient contact of hydrogen-absorbing alloy particles, having been oxidized, with each other. The low degree of activation observed with the content exceeding 30% is due to the decreased reactive area of the electrode as caused by low packing density.

Further as seen from FIG. 8, the battery B10 using a hydrogen-absorbing alloy powder containing less than 5% of spherical particles having a diameter of at least 2 times the average diameter and the battery B13 using a hydrogen-absorbing alloy powder containing more than 30% of spherical particles having a diameter of at least 2 times the average diameter have a shorter battery life as compared with the batteries B11, B3 and B12 using a hydrogen-absorbing alloy powder containing 5 to 30% of spherical particles having a diameter of at least 2 times the average diameter. The short battery lives observed with the content being less than 5% is due to the decreased charge-discharge capacity as caused by marked degradation by oxidation of hydrogen-absorbing alloy powder. The short battery lives observed with the content exceeding 30% is due to the decreased charge-discharge capacity as caused by low packing density.

Although the above description has been made on the case where a hydrogen-absorbing alloy powder of $MmNi_{3.2}Co_{1.0}Al_{0.2}Mn_{0.6}$ (an $AB_5$-type hydrogen-absorbing alloy powder having a $CaCu_5$-type crystal structure) was used, the type of the hydrogen-absorbing alloy powder used in the present invention is not specifically limited and for example $AB_2$-type ones having a C14-type or C15-type Laves-phase crystal structure can also be used.

Obviously, numerous modifications and variations of the present invention is possible in light of the above teachings. It is therefore to be understood that within the scope of the appended claims, the invention may be practiced otherwise than as specifically described herein.

What is claimed is:

1. A hydrogen-absorbing alloy electrode for metal hydride alkaline batteries, obtained by coating or filling a collector with a hydrogen-absorbing alloy powder consisting essentially of spherical particles and/or spherically shaped particles and then sintering the powder, said powder having an average particle diameter of 30 to 70 μm and containing 5 to 30% by volume of particles having a diameter of at least times the average diameter and 10 to 40% by volume of particles having a diameter of not more than ½ of the average diameter.

2. The hydrogen-absorbing alloy electrode for metal hydride alkaline batteries according to claim 1, wherein said hydrogen-absorbing alloy powder is prepared by centrifugal spraying or gas atomization.

3. The hydrogen-absorbing alloy electrode for metal hydride alkaline batteries according to claim 1, wherein said hydrogen-absorbing alloy powder is a powder of a hydrogen-absorbing alloy having a $CaCu_5$-type crystal structure.

4. The hydrogen-absorbing alloy electrode for metal hydride alkaline batteries according to claim 1, wherein said hydrogen-absorbing alloy powder is a powder of a hydrogen-absorbing alloy having a C14-type or C15-type Laves-phase crystal structure.

5. The hydrogen-absorbing alloy electrode according to claim 3, wherein said hydrogen-absorbing alloy comprises Misch metal, nickel, cobalt, aluminum and manganese.

6. The hydrogen-absorbing alloy electrode according to claim 2, wherein said sintering is conducted at a temperature from 800° to 1000° C. for 0.5 to 2 hours.

* * * * *